(12) United States Patent
Cooke et al.

US012199285B2

(10) Patent No.: US 12,199,285 B2
(45) Date of Patent: Jan. 14, 2025

(54) ELECTRODE FOR LITHIUM SULPHUR CELL

(71) Applicant: GELION TECHNOLOGIES PTY LTD, Eveleigh (AU)

(72) Inventors: Ashley Cooke, Abingdon (GB); Lisset Urrutia, Abingdon (GB); Stephen Rowlands, Abingdon (GB); Philip J. Toy, Abingdon (GB)

(73) Assignee: GELION TECHNOLOGIES PTY LTD, Eveleigh (AU)

( * ) Notice: Subject to any disclaimer, the term of this patent is extended or adjusted under 35 U.S.C. 154(b) by 0 days.

(21) Appl. No.: 16/347,565

(22) PCT Filed: Nov. 8, 2017

(86) PCT No.: PCT/GB2017/053364
§ 371 (c)(1),
(2) Date: May 3, 2019

(87) PCT Pub. No.: WO2018/087543
PCT Pub. Date: May 17, 2018

(65) Prior Publication Data
US 2019/0288288 A1     Sep. 19, 2019

(30) Foreign Application Priority Data
Nov. 11, 2016  (EP) ..................................... 16198386

(51) Int. Cl.
| | | |
|---|---|---|
| *H01M 4/13* | (2010.01) | |
| *H01M 4/1397* | (2010.01) | |
| *H01M 4/36* | (2006.01) | |
| *H01M 4/38* | (2006.01) | |
| *H01M 4/58* | (2010.01) | |
| *H01M 4/62* | (2006.01) | |
| *H01M 4/66* | (2006.01) | |

(52) U.S. Cl.
CPC ......... *H01M 4/622* (2013.01); *H01M 4/1397* (2013.01); *H01M 4/364* (2013.01); *H01M 4/38* (2013.01); *H01M 4/382* (2013.01); *H01M 4/5815* (2013.01); *H01M 4/625* (2013.01); *H01M 4/66* (2013.01)

(58) Field of Classification Search
None
See application file for complete search history.

(56) References Cited

U.S. PATENT DOCUMENTS

| | | | | |
|---|---|---|---|---|
| 2006/0246354 | A1* | 11/2006 | Lee ..................... | H01M 4/0416 429/246 |
| 2009/0233237 | A1* | 9/2009 | Yoshiki .................. | H05K 3/106 430/311 |
| 2011/0059361 | A1* | 3/2011 | Wilkening .............. | H01M 4/80 429/218.1 |
| 2011/0206992 | A1* | 8/2011 | Campbell .............. | H01G 11/24 429/235 |
| 2014/0017569 | A1* | 1/2014 | Wang ................... | H01M 10/052 429/231.8 |
| 2014/0072873 | A1* | 3/2014 | Wang .................... | H01M 4/621 429/217 |
| 2016/0149261 | A1* | 5/2016 | Zaghib ................ | H01M 2/1673 429/94 |
| 2016/0172667 | A1* | 6/2016 | Yan ....................... | H01M 4/661 429/213 |
| 2017/0027169 | A1* | 2/2017 | Benson ............. | C11D 17/0008 |
| 2018/0108956 | A1* | 4/2018 | Fortenbacher ...... | H01M 10/615 |
| 2019/0288288 | A1† | 9/2019 | Cooke | |

FOREIGN PATENT DOCUMENTS

| | | | | |
|---|---|---|---|---|
| CN | 101728515 | A | 6/2010 | |
| CN | 102598364 | A | 7/2012 | |
| CN | 103173161 | A | 6/2013 | |
| CN | 103474697 | A | 12/2013 | |
| CN | 103258990 | B | 8/2015 | |
| CN | 105226288 | | * 1/2016 | |
| CN | 105226288 | A † | 1/2016 | |
| KR | 102000-0015373 | | * 7/2000 | |
| KR | 20000036694 | A † | 7/2000 | |
| KR | 2004-0033678 | A | 4/2004 | |
| KR | 20040033678 | | * 4/2004 | ............. Y02E 60/10 |
| KR | 20120061932 | | * 6/2012 | ............. H01G 11/06 |
| WO | WO 2011/031297 | | * 9/2009 | |
| WO | 2011031297 | A2 † | 3/2011 | |
| WO | WO 2016/169398 | | * 10/2016 | ............ H01M 4/622 |
| WO | WO 2016/169398 | A1 | 10/2016 | |

OTHER PUBLICATIONS

Communication pursuant to Article 94(3) EPC for EP application No. 16198386.1 dated Jun. 4, 2020, 10 pages.
Patel et al., "Low surface area graphene/cellulose composite as a host matrix for lithium sulphur batteries", Journal of Power Sources, vol. 254, Dec. 26, 2013, pp. 55-61, DOI: 10.1016/J.JPOWSOUR. 2013.12.081.
Zhou et al., "Amylopectin Wrapped Graphene Oxide/Sulfur for Improved Cyclability of Lithium-Sulfur Battery", ACS Nano, vol. 7, No. 10, Oct. 22, 2013, pp. 8801-8808, DOI: 10.1021/nn403237b.
Zhu et al., "Enhanced electrochemical performance from cross-linked polymeric network as binder for Li-S battery cathodes", Journal of Applied Electrochemistry, Springer, Dordrecht, NL, vol. 46, No. 7, Apr. 9, 2016, pp. 725-733, DOI: 10.1007/510800-016-0957-X.

(Continued)

*Primary Examiner* — Barbara L Gilliam
*Assistant Examiner* — Angela J Martin
(74) *Attorney, Agent, or Firm* — BakerHostetler

(57) ABSTRACT

According to the present disclosure, there is an electrode for a lithium sulphur cell. The electrode comprises a matrix deposited on a current collector, wherein the matrix comprises an electrically conductive material, an electroactive sulphur material and a binder comprising a polymer that is crosslinked to form a crosslinked polymer network.

7 Claims, 1 Drawing Sheet

(56) References Cited

OTHER PUBLICATIONS

International Search Report and Written Opinion from the International Searching Authority for PCT/GB2017/053364 dated Jan. 4, 2018, 19 pages.
Office Action issued in corresponding Chinese Patent Application No. 201780066044.6 dated Nov. 22, 2021, with English translation thereof.

\* cited by examiner
† cited by third party

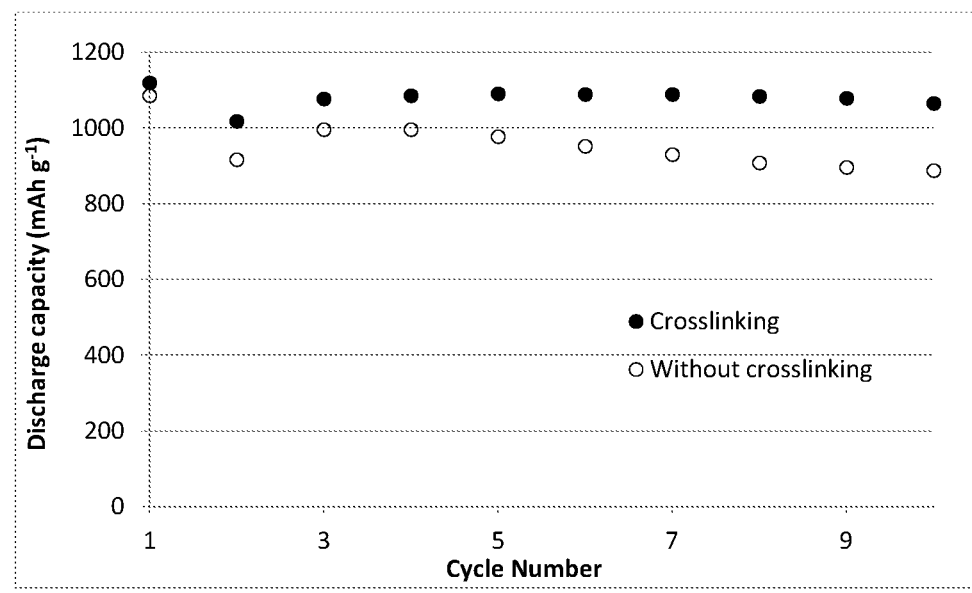

ELECTRODE FOR LITHIUM SULPHUR CELL

CROSS-REFERENCE TO RELATED APPLICATIONS

This application is a National Stage filing under 35 U.S.C. § 371 of International Patent Application No. PCT/GB2017/053364, filed Nov. 8, 2017 and entitled "ELECTRODE FOR LITHIUM SULPHUR CELL," which claims the benefit of priority to EP application No. 16198386.1, filed Nov. 11, 2016, both applications of which are herein incorporated by reference in their entirety for all purposes.

BACKGROUND

This invention relates to an electrode for a lithium sulphur cell. This invention also relates to a method of producing such an electrode, and a lithium sulphur cell comprising such an electrode.

BACKGROUND

A typical lithium-sulphur cell comprises an anode (negative electrode) formed from lithium metal or a lithium metal alloy, and a cathode (positive electrode) formed from elemental sulphur or other electroactive sulphur material. The sulphur or other electroactive sulphur-containing material may be mixed with an electrically conductive material, such as carbon, to improve its electrical conductivity. The carbon and sulphur may be ground, and then mixed with a solvent and binder to form a slurry. The slurry may be applied to a current collector, and then dried to remove the solvent. The resulting structure is calendared to form a composite structure, which is cut into the desired shape to form a cathode. A separator may be placed on the cathode, and electrolyte may be applied to the separator to wet the cathode and separator. A lithium anode may be placed on the separator to form a cell stack.

BRIEF DESCRIPTION OF FIGURES

Aspects of the present disclosure are shown schematically, by way of example only, in the accompanying drawing, in which:

FIG. 1 shows how the discharge capacity of the cells of Example 1 vary with cycle number.

DESCRIPTION

Before particular examples of the present invention are described, it is to be understood that the present disclosure is not limited to the particular cell, method or material disclosed herein. It is also to be understood that the terminology used herein is used for describing particular examples only and is not intended to be limiting, as the scope of protection will be defined by the claims and equivalents thereof.

The terms "protein" or "polypeptide" or "peptide" are used interchangeably and refer to molecules consisting of a chain of amino acids, without reference to a specific mode of action, size, three-dimensional structure or origin.

"Gelatin" and "gelatin-like protein" as used herein refers to any gelatin, whether extracted by traditional methods or recombinant or biosynthetic in origin, or to any molecule having at least one structural and/or functional characteristic of gelatin. The term encompasses both the composition of more than one polypeptide included in a gelatin product, as well as an individual polypeptide contributing to the gelatin material. Thus, the term gelatin as used in reference to the present invention encompasses both a gelatin material comprising gelatin polypeptides, as well as an individual gelatin polypeptide.

A "crosslinking agent" as described herein refers to a composition comprising a crosslinker. "Crosslinker" as used herein refers to a reactive chemical compound that is able to introduce covalent intra- and inter-molecular bridges in organic molecules.

In describing and claiming the cell and method of the present invention, the following terminology will be used: the singular forms "a", "an", and "the" include plural forms unless the context clearly dictates otherwise. Thus, for example, reference to "an anode" includes reference to one or more of such elements.

According to the present invention, there is an electrode for a lithium sulphur cell. The electrode comprises a matrix deposited on a current collector, wherein the matrix comprises an electrically conductive material, an electroactive sulphur material and a binder comprising a polymer that is crosslinked to form a crosslinked polymer network.

In another aspect, the present invention also provides a lithium sulphur cell comprising an electrode as described above. The electrode is preferably the cathode of the cell. The anode may be an anode comprising lithium metal, for example, pure lithium metal or a lithium metal alloy. Other suitable anode materials include anodes suitable for use in a lithium-ion battery, for example, silicon or graphite anodes.

In another aspect, the present invention provides a method of producing an electrode for a lithium sulphur cell. The method comprises depositing an electrode mixture comprising an electrically conductive material, an electroactive sulphur material, and a binder comprising a polymer onto a current collector, whereby the polymer is crosslinked to form a crosslinked polymer network on the current collector.

The polymer may be crosslinked prior to being deposited on the current collector, or may be polymerised after being deposited on the current collector, for example, by exposure to a crosslinking agent.

By crosslinking the polymer, the electrically conductive material and electroactive sulphur material may be held in place by a crosslinked polymer network. This crosslinked polymer network can improve the structural integrity of the electrode, helping the charged species formed during the charge and discharge cycles of the lithium sulphur cell to remain in electrical contact with the current collector as the cell is charged and discharged. Advantageously, this can result in an improvement in the cycle life of the lithium sulphur cell.

Binder

The binder comprises a polymer that is crosslinked to form a polymer network. The polymer may be any crosslinkable polymer. For example, the polymer may comprise a functional group that may be crosslinked. Examples of suitable functional groups include amine, amide, carbonyl, carboxyl, ether, thioether and hydroxyl groups. In one embodiment, the polymer is crosslinked via a functional group selected from at least one of amine, amide, carbonyl, carboxyl, ether, thioether, imine and hydroxyl. In a preferred embodiment, the polymer comprises amino acids residues. The crosslinking may occur via one or more of these residues.

Preferably, the polymer is a biopolymer. The biopolymer is selected from polypeptides and polysaccharides. Suitable polypeptides include gelatin, collagen and collagen mimetic peptides. Suitable polysaccharides include chitosan, hyaluronate and hyaluronic acid. In a preferred embodiment, the polymer is gelatin.

In one embodiment, the polymer is a polyacrylamide.

The polymer may form 0.01 to 50 weight % of the matrix deposited on the current collector. Preferably, the polymer forms 0.01 to 20 weight % of the matrix deposited on the current collector. More preferably, the polymer may form 0.1 to 15 weight %, for example, 1 to 10 weight % of the matrix deposited on the current collector.

The ratio of the weight of polymer to the weight of electrically conductive material (e.g. carbon) and electroactive sulphur material (e.g. sulphur) may be 0.01-10:30-60, preferably 0.1-5:35-55, more preferably 1-3:40-50. In one embodiment, the weight ratio of polymer to the electrically conductive material (e.g. carbon) may be 0.01-15:5-35, preferably 0.1-10:8-25, more preferably 1-5:10-15. In one embodiment, the weight ratio of polymer to the electroactive material (e.g. sulphur) may be 0.01-20:20-50, preferably 0.1-15:25-45, more preferably 1-10:30-40.

Crosslinking Agent

The polymer may be crosslinked using any suitable method, for example, by heating or by exposure to irradiation, for instance, UV radiation. For example, where a biopolymer such as gelatin is used, the polymer may be crosslinked by heating.

In some examples, the polymer is crosslinked by reacting a crosslinking agent with the polymer. Any suitable crosslinking agent may be employed.

Suitable crosslinking agents include aldehydes. Examples of suitable aldehydes include formaldehyde, di-aldehydes, glutaraldehyde, glyceraldehyde and furfural. In some embodiments, ketones are used as crosslinking agents. Suitable ketones include acetone, diacetal and other diones for example, pentanedione, for instance, a chloropentane dione.

Other examples of crosslinking agents include carbodiimide, urea, glyoxal, polyformals, imines, di-epoxy compounds and di-isocyanates. Enzymes may also be used, for example, trans-glutaminase. In a further embodiment, the crosslinking agent is selected from bis (2-chloroethylurea); 2-hydroxy-4,6-dichloro-1,3,5-triazine; reactive halogen-containing compounds disclosed in U.S. Pat. No. 3,288,775; carbamoyl pyridinium compounds in which the pyridine ring carries a sulphate or an alkyl sulphate group disclosed in U.S. Pat. Nos. 4,063,952 and 5,529,892; divinylsulfones, and S-triazine derivatives such as 2-hydroxy-4,6-dichloro-s-triazine. Yet further examples of suitable crosslinking agents include 1-ethyl-3-[3-dimethylaminopropyl]carbodiimide hydrochloride (EDC or EDAC).

The crosslinking agent may be added in any suitable amount. For example, the weight ratio of crosslinking agent to polymer in the binder may be 0.01-20:10-200, preferably 0.1-10:20-100, more preferably 1-5:10-50.

The polymer may be crosslinked by any suitable method. For example, in one embodiment, an electrode mixture comprising the electrically conductive material, electroactive sulphur material and binder may be dispersed in a solvent (e.g. water or an organic solvent) to form a slurry that is applied to a current collector. The slurry may be dried and the resulting structure compressed to form a matrix deposited on the current collector. A crosslinking agent may be applied to the matrix to crosslink the polymer in the matrix. The crosslinking agent may be applied as a separate solution or mixed with the electrolyte solution that is subsequently contacted with the electrode during assembly of the cell.

In an alternative embodiment, the crosslinking agent may be added to the slurry before or after it is deposited on the current collector.

In yet another alternative, the polymer may be crosslinked prior to being incorporated into the electrode mixture. The resulting mixture comprises the electrically conductive, material electroactive sulphur material and crosslinked polymer binder may be dispersed in a solvent (e.g. water or an organic solvent) to form a slurry that is applied to a current collector. The slurry may be dried and the resulting structure compressed to form a matrix deposited on the current collector.

The crosslinking reaction may be enhanced by the addition of moisture, irradiation with, for example, UV or by increased temperature.

Electroactive Sulphur Material and Electrically Conductive Material

The matrix includes a mixture of electroactive sulphur material and electrically conductive material. This mixture forms an electroactive layer, which is placed in contact with a current collector.

The electroactive sulphur material may comprise elemental sulphur, sulphur-based organic compounds, sulphur-based inorganic compounds and sulphur-containing polymers. Preferably, elemental sulphur is used.

The electrically conductive material may be any suitable solid electrically conductive material. Preferably, this solid electroconductive material may be formed of carbon. Examples include carbon black, carbon fibre, graphene and carbon nanotubes. Other suitable materials include metal (e.g. flakes, filings and powders) and conductive polymers. Preferably, carbon black is employed.

The electroactive sulphur material may be present in the matrix deposited on the current collector in an amount of 60 to 90 weight %, preferably 65 to 85 weight %, more preferably 70 to 80 weight %.

The electrically conductive material may be present in the matrix deposited on the current collector in an amount of 10 to 45 weight %, preferably 15 to 35 weight %, more preferably 20 to 25 weight %.

The weight ratio of electroactive sulphur material to electrically conductive material may be 0.01-10:10-50, preferably 0.1-5:15-45, more preferably 1-5:20-35.

Lithium Sulphur Cell

The electrochemical cell of the present invention may be any suitable lithium-sulphur cell. The cell typically includes an anode, a cathode formed from an electrode described herein, and an electrolyte. The anode may be formed of lithium metal or a lithium metal alloy. Preferably, the anode is a metal foil electrode, such as a lithium foil electrode. The lithium foil may be formed of lithium metal or lithium metal alloy.

A separator may be placed between the anode and cathode. Electrolyte may be introduced into the cell to wet the cathode and separator. In one embodiment, the separator is placed on the cathode and wet with electrolyte before anode is placed over the separator. The electrolyte may be applied to the separator, for example, by coating or spraying.

The electrolyte allows charge to be transferred between the anode and cathode. Preferably, the electrolyte wets the pores of the cathode as well as the pores of the separator. In one embodiment, the electrolyte used to assemble the cell comprises a crosslinking agent that can react and crosslink the polymer present in the binder. Suitable crosslinking agents are mentioned above. Where present, the crosslinking agent may be present in the electrolyte in a concentration of 0.01-10 weight %, preferably 0.1-1 weight %.

Any suitable electrolyte may be used. The electrolyte may comprise an organic solvent and a salt, for example, a lithium salt. Suitable organic solvents include ethers, esters, amide, amine, sulfoxides, sulfamides, organophosphates and sulfones. Examples include tetrahydrofuran, 2-methyltetrahydrofuran, methylpropylpropionate, ethylpropylpropionate, methyl acetate, 1,2-dimethoxyethane, 1,3-dioxolane, diglyme (2-methoxyethyl ether), triglyme, tetraglyme, butyrolactone, 1,4-dioxane, 1,3-dioxane, hexamethyl phosphoamide, pyridine, dimethyl sulfoxide, tributyl phosphate, trimethyl phosphate, N, N, N, N-tetraethyl sulfamide, and sulfones and their mixtures.

Suitable electrolyte salts include lithium salts. Suitable lithium salts include lithium hexafluorophosphate, lithium hexafluoroarsenate, lithium nitrate, lithium perchlorate, lithium trifluoromethanesulfonimide, lithium bis(oxalate) borate and lithium trifluoromethanesulphonate. Preferably the lithium salt is lithium trifluoromethanesulphonate (also known as lithium triflate). Combinations of salts may be employed. For example, lithium triflate may be used in combination with lithium nitrate. The lithium salt may be present in the electrolyte at a concentration of 0.1 to 5M, preferably, 0.5 to 3M.

A separator may be placed between the anode and cathode. Where a separator is present in the cell of the present invention, the separator may comprise any suitable porous substrate that allows ions to move between the electrodes of the cell. The separator should be positioned between the electrodes to prevent direct contact between the electrodes. The porosity of the substrate should be at least 30%, preferably at least 50%, for example, above 60%. Suitable separators include a mesh formed of a polymeric material. Suitable polymers include polypropylene, nylon and polyethylene. Non-woven polypropylene is particularly preferred. It is possible for a multi-layered separator to be employed.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

Example 1

In this example, carbon and sulfur were milled and mixed with polymer binder and water to form slurry in which the sulfur content was 75 wt %, carbon 23 wt % and gelatin binder 2 wt % (40-50 wt % in $H_2O$). A solution containing acetone as a crosslinking agent (water:crosslinking agent (2:1 ratio)) was added as a solvent to the dispersion to form a dispersion having a 20 wt % solids content. The slurry was then applied to a current collector and dried at 35° C. to remove the solvent from the cathodes which were coated to obtain 5.0 mAh·cm$^{-2}$ surface capacity. The cathodes were used to assemble 6S/5Li cells that were filled with an ether-based electrolyte.

FIG. 1 below shows the discharge performance of the cell that was cycled at 0.2 C and 0.1 C rates (discharge-charge respectively) and compared to a cell where no crosslinking agent was added. It can be observed that, even though both cells showed similar initial discharge capacity values, the cell produced using the crosslinking agent remained stable over time at a sulfur utilisation of ca. 1100 mAh·g$_{(s)}^{-1}$. On the other hand, the cell assembled using an un-crosslinked binder started fading after the third cycle.

The improvement observed with the use of a crosslinked binder may be attributed to the enhanced structural integrity of the cathode caused by the reaction of the polymer binder with the crosslinking agent. This crosslinking reaction is also believed to improve the coating adhesion to the current collector, reducing the risk of detachment that may cause premature fading of the cell.

Example 2

Cathodes were formed by depositing a mixture of sulphur, carbon and gelatin on a current collector. Two squares (2×2 cm) were cut from the cathodes.

In a glovebox, 5 drops of formalin (37% formaldehyde in $H_2O$ with 10% methanol as stabiliser) were applied to one of the cathode samples and left overnight. A scrape test was then conducted with cotton buds and showed the formalin-treated sample to have far superior cathode integrity and adhesion to the current collector than the untreated sample.

Example 3

A series of experiments were carried out to investigate if crosslinking of gelatin with formaldehyde occurs.

A TA Instruments DHR2 rheometer was used in oscillation time sweep mode to measure Storage/Loss Modulus and Phase Angle.

Preparation of Gelatin Stock Solution:

15 grams of gelatin @ 45%, from cold water fish skin, (ex Sigma Aldrich G7765) was weighed out into a 100 cm$^{-3}$ glass beaker, to which 15 grams of de-ionised water was added, then mixed on a IKA Magnetic stirrer for 5 minutes.

Preparation of Gelatin/Formaldehyde Solution 3 grams of the prepared gelatin solution was weighed into a glass vial to which 0.036 grams of formaldehyde solution (ex Sigma Aldrich 252549) was added and mixed on an IKA Magentic stirrer to give a 2% solution.

Rheometry

A TA Instruments DHR 2 rheometer was used to measure the viscoelastic nature of the gelatin/formaldehyde solution, together with the gelatin stock solution as a baseline. Below are listed the rheometer parameters and test conditions:

Rheometer Parameters:

Rheometer: TA Instruments DHR2 rheometer

Geometry: Parallel Plate 40 mm diameter

Oscillation Time for 2 hours @ 2% Strain, 1 Hz Frequency

Peltier Plate Temperature: 40° C.

Results:

From the oscillation time sweeps there was little deviation in loss modulus and phase angle for gelatin stock solution. Hence there was no evidence of crosslinking.

There was, however, evidence of crosslinking of gelatin by the addition of 2% formaldehyde. A clear change in modulus was observed with crossover point @ 3841 seconds. Phase angle dropped from approximately 90° to 2° confirming an increase in the gel structure.

The invention claimed is:

1. A method of producing an electrode for a lithium sulphur cell, said method comprising:
    depositing an electrode mixture onto a current collector to coat the current collector,
    wherein the electrode mixture comprises an electrically conductive material, an electroactive sulphur material, and a binder comprising a biopolymer that is selected from polypeptides; and then
    contacting the coated current collector with a crosslinker to crosslink the biopolymer, whereby a matrix comprising a crosslinked biopolymer network is formed on the current collector, wherein
        the biopolymer is crosslinked via a functional group selected from at least one of amine, amide, carbonyl, carboxyl, ether, and hydroxyl and using a crosslinking agent that is selected from formaldehyde, a di-isocyanate, an epoxy, and a carbodiimide, and
        the electroactive sulphur material and the electrically conductive material are held in place by the crosslinked biopolymer network.

2. The method as claimed in claim 1, wherein a slurry comprising the electrode mixture and a solvent is deposited onto the current collector.

3. The method as claimed in claim 1, wherein a crosslinking agent is added to an electrolyte that is subsequently contacted with the coated current collector.

4. The method as claimed in claim 1, wherein the biopolymer is a polypeptide selected from gelatin, collagen, and collagen mimetic peptides.

5. The method as claimed in claim 1, wherein the matrix comprises 0.01 to 50 weight % of the crosslinked polymer.

6. The method as claimed in claim 1, wherein the electrically conductive material comprises a particulate carbon material and the electroactive sulphur material comprises elemental sulphur.

7. The method as claimed in claim 1, wherein the electrically conductive material and the electroactive sulphur material are dispersed in the crosslinked biopolymer network in the matrix.

* * * * *